July 1, 1941.   H. A. BEEKHUIS, JR   2,247,470
PROCESS FOR THE SEPARATION OF NITROSYL CHLORIDE AND CHLORINE
Filed Aug. 9, 1938
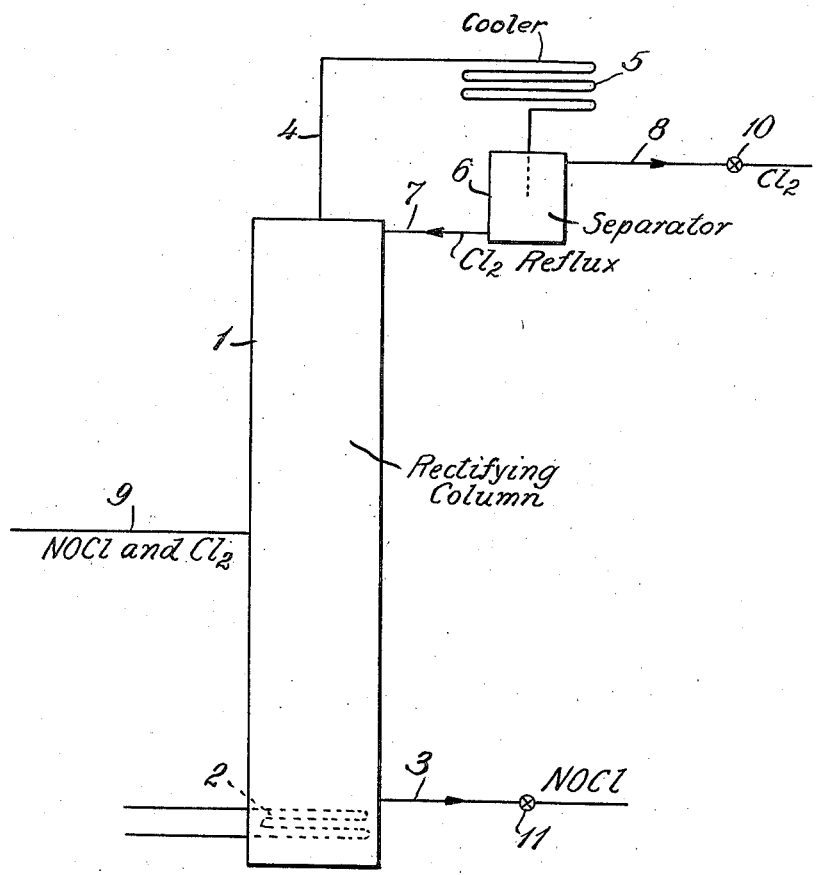
INVENTOR
Herman A. Beekhuis Jr.
BY
Charles W. Brown
ATTORNEY Patented July 1, 1941

2,247,470

UNITED STATES PATENT OFFICE 2,247,470

PROCESS FOR THE SEPARATION OF NITROSYL CHLORIDE AND CHLORINE

Herman A. Beekhuis, Jr., Petersburg, Va., assignor to The Solvay Process Company, New York, N. Y., a corporation of New York Application August 9, 1938, Serial No. 223,809

4 Claims. (Cl. 202—41)

This invention relates to a process for the treatment of a liquid mixture of nitrosyl chloride and chlorine to recover therefrom a commercially pure chlorine product separate from the nitrosyl chloride.

It is known that a gas mixture principally consisting of nitrosyl chloride and chlorine such as is obtained by the reaction of metal chloride and nitric acid may be treated by condensing both the nitrosyl chloride and chlorine to form a mixture of liquefied gases and that the liquid may be distilled to accomplish a separation of a chlorine-rich distillate leaving a nitrosyl chloride-rich residue.

I have discovered that a commercially pure chlorine, substantially free from nitrosyl chloride, may be obtained from a liquid mixture of chlorine and nitrosyl chloride by a process of fractional distillation by introducing the liquid mixture into a mid-portion of a rectifying column. In this column the liquid passes downwardly in contact with vapors of nitrosyl chloride to vaporize the chlorine and substantially free the liquid of chlorine, leaving a relatively pure liquid nitrosyl chloride at the bottom of the column. This liquid nitrosyl chloride is boiled and the vapors of nitrosyl chloride thus generated are used, as described, for the vaporization of chlorine from the mixture of nitrosyl chloride and chlorine in the rectifying column. If all of the nitrosyl chloride is vaporized, a part of the vapors may be withdrawn without passing them in contact with the liquid mixture in the column to obtain a relatively pure nitrosyl chloride product. It is preferred, however, to vaporize only a portion of the nitrosyl chloride and to withdraw the remaining unvaporized liquid nitrosyl chloride as product of the process. In the rectifying column the chlorine gas vaporized from the liquid mixture entering the column passes upwardly through the upper portion of the column in contact with a descending stream of liquid chlorine which serves to free the ascending chlorine gas of vapors of nitrosyl chloride. The resulting pure chlorine gas substantially free from nitrosyl chloride is cooled to condense a portion of it for refluxing in contact with the vapors in the rectifying column, and the remaining chlorine is withdrawn as a pure chlorine product without refluxing it in contact with the gases and vapors in the rectifying column.

I have discovered that in carrying out the process of this invention as described above, a chlorine product of particularly high commercial purity may be obtained when the ratio of liquid chlorine refluxed in contact with the vapors in the distillation column to the chlorine withdrawn as product from the process is:

$$0.35\left(0.6+\frac{NOCl}{Cl_2}\right)(0.75+\sqrt{p}) \text{ to}$$

$$1\left(0.6+\frac{NOCl}{Cl_2}\right)(0.75+\sqrt{p}),$$

where $$\frac{NOCl}{Cl_2}$$

is the mol ratio of nitrosyl chloride to chlorine in the liquid introduced into the mid-portion of the rectifying column and $p$ is the pressure in atmospheres of the gases in the rectifying column and is no more than about 20 atmospheres. (All pressures given herein are absolute pressures.) When the liquid introduced into the fractionating column contains about equal proportions of nitrosyl chloride and chlorine, it is preferred that the ratio of chlorine refluxed in the column to chlorine withdrawn as product be equal to 2 to 3; i. e., that 2 to 3 parts by weight of chlorine be condensed to liquid chlorine and used as reflux in the distillation column to every one part by weight of chlorine drawn off as the pure chlorine product of the process.

I have further discovered that by maintaining a mixture of nitrosyl chloride and chlorine which is being fractionally distilled under a pressure in excess of atmospheric, the effect of the pressure is to decrease the differential between the partial pressures of chlorine and of nitrosyl chloride in contact with a liquid mixture of the two and thus the difficulties of fractionally distilling a liquid mixture of nitrosyl chloride and chlorine are increased. I have discovered, however, the adverse effect upon the fractional distillation of mixtures of these materials of using pressures of about 4 to 20 atmospheres may be readily compensated for by increasing the effectiveness with which vapors evolved from the liquid mixture are treated with refluxed chlorine in the rectification column and that by operating the distillation and rectification procedure under such pressures in excess of atmospheric, the process as a whole may be made more economic since this use of pressure permits of condensing the required liquid chlorine reflux at much higher temperatures than when operating at atmospheric pressure and, further, the capacity of a rectification column of a given cross-sectional area is increased. Accordingly, this invention includes a process for the separation of nitrosyl chloride and chlorine from a liquid mixture of the same by distilling the liquid and rectifying the vapors with liquid chlorine condensed therefrom while maintaining the vapors under a pressure of about 4 to 20 atmospheres, preferably under a pressure of 4 atmospheres. By maintaining a pressure of about 8 atmospheres or above, the chlorine may be condensed by heat exchange with a cooling medium at naturally prevailing temperatures, and under some conditions of plant installation this represents a desirable feature of this invention.

The process of this invention will be more completely described in connection with the following example illustrative of the invention:

The accompanying drawing illustrates an apparatus suitable for carrying out the invention. In that drawing the numeral 1 indicates a rectification column of the usual type for the distillation and rectification of a liquid mixture provided with means, not shown in the drawing, such as bubble plates or packing for intimately contacting liquid descending through the column with ascending vapors. The bottom of the column is provided with a heater 2 and a liquid draw-off 3. The top of the column is provided with a gas draw-off 4 leading to a cooler 5 from which a mixture of liquid and gas flows to a separator 6. A pipe 7 for return of liquid from separator 6 to the top of column 1 and a draw-off for gas 8 from separator 6 are provided.

In employing the apparatus illustrated in the drawing for carrying out the process of this invention, a liquid mixture of nitrosyl chloride and chlorine is introduced through a pipe 9 into a mid-portion of rectifying column 1. Liquid nitrosyl chloride in the bottom of the rectifying column is boiled by means of heat supplied through heater 2 and the vapors thus obtained pass upwardly in the column in contact with the descending liquid mixture. The nitrosyl chloride is vaporized in amount sufficient to substantially free the incoming liquid of chlorine while the remaining liquid nitrosyl chloride is drawn from the bottom of column 1 through draw-off 3. The vaporized chlorine ascends through the top of column 1 and passes through pipe 4 to cooler 5 where a part of the chlorine is liquefied by indirect heat exchange with refrigerated brine. In separator 6 the liquefied chlorine is separated from the remaining gaseous chlorine and the liquid is returned through pipe 7 to the top of column 1 to provide reflux for the treatment in the top of the column of the vapors ascending through the column. The chlorine gas separated from the liquid chlorine in separator 6 is drawn off as product through 8. The liquid nitrosyl chloride in the mixture introduced into the rectifying column flows to the bottom of the column and is boiled to provide the vapors for treating the incoming liquid to free it of chlorine.

The mixture of liquid nitrosyl chloride and chlorine to be treated in accordance with the process of this example may contain about equal proportions of the two constituents and be pumped into rectification column 1 while maintaining the column under a pressure of 4 atmospheres by means of valves 10 and 11 in draw-offs 8 and 3. The preferred mid-point of column 1 into which the liquid mixture is introduced is that point at which the composition of liquid in the column with respect to nitrosyl chloride and chlorine content is the same as the liquid introduced into the column. However, the liquid may be introduced at a point somewhat above or below this point, although this will entail some sacrifice in efficiency of the column. In cooler 5 the chlorine vapors leaving the top of the column are cooled sufficiently to condense two-thirds to three-fourths of the chlorine which is returned as chlorine reflux to the top of column 1 while the remaining uncondensed one-third to one-fourth of the chlorine is withdrawn through draw-off 8 as a commercially pure chlorine product. With the vapors in the rectifying column being maintained under a pressure of about 4 atmospheres, the desired liquid chlorine reflux may be condensed in cooler 5 by cooling the chlorine to about 0° C.

The foregoing example may be modified in many respects without departing from the invention. For example, the desired liquid chlorine reflux for rectifying column 1 may be obtained by providing cooling coils in the top of the column itself and supplying to these cooling coils a cooling medium at a temperature suitable for condensing the desired amount of reflux liquid chlorine which is permitted to flow downwardly in the column while the uncondensed chlorine gas is withdrawn from the top of the column as product. Instead of condensing in cooler 5 only a portion of the chlorine gas leaving the top of column 1, all of the gaseous chlorine leaving column 1 may be condensed in cooler 5 and a portion of the condensed liquid chlorine returned to the top of column 1 while another portion is withdrawn as product. Furthermore, the nitrosyl chloride flowing to the bottom of column 1 may all be vaporized by means of heater 2 and the desired portion of vaporized nitrosyl chloride passed upwardly in column 1 while the remaining nitrosyl chloride vapors are withdrawn as product from the bottom of the column.

Instead of providing a heating coil to vaporize nitrosyl chloride in the bottom of the rectifying column, the liquid nitrosyl chloride flowing to the bottom of the column may be passed into a separate vaporizer where it is boiled to provide the vapors of nitrosyl chloride for treating the liquid mixture in the bottom of the rectifying column. The purified nitrosyl chloride product of the process may be withdrawn from this vaporizer either as liquid or as gas.

The process described herein may be modified to introduce into the mid-portion of the rectification column a gaseous mixture of nitrosyl chloride and chlorine. In thus operating, the mixture will be treated in the column by means of the vapors of nitrosyl chloride passing upwardly and the reflux of liquid chlorine passing downwardly therein. Except that when the mixture is introduced into the rectification column as a gas, it will preferably be introduced at a mid-point of the column where the vapors or gases in the column have the same composition as the entering gases, the process taking place in the column and the conditions of operation with respect to ratio of chlorine refluxed in the column to that withdrawn as product may be the same as when introducing to the column a liquid mixture of nitrosyl chloride and chlorine corresponding to that which first would be obtained on partially liquefying the gas in a chamber immersed in a cooling medium. Accordingly, when the mixture of nitrosyl chloride and chlorine is introduced into the rectifying column as a mixture of gases, the ratio of chlorine refluxed to that withdrawn as product is maintained in the range of $$0.35\left(0.6+\frac{NOCl}{Cl_2}\right)(0.75+\sqrt{p}) \text{ to }$$
$$1\left(0.6+\frac{NOCl}{Cl^2}\right)(0.75+\sqrt{p})$$

where $$\frac{NOCl}{Cl_2}$$

is the mol ratio of nitrosyl chloride to chlorine in the condensate which would initially form upon cooling the gas mixture to a temperature at which the gas is partially liquefied.

This application is a continuation-in-part of my co-pending application Serial No. 696,138, filed November 1, 1933, now United States Patent No. 2,130,519, granted September 20, 1938.

I claim:

1. The process for the separation of a mixture of liquid nitrosyl chloride and chlorine which comprises continuously introducing said liquid mixture into a mid-portion of a rectifying column, passing the liquid mixture downwardly in the column in contact with vapors of nitrosyl chloride to vaporize the chlorine and substantially to free the mixture of chlorine leaving relatively pure nitrosyl chloride, continuously boiling the liquid nitrosyl chloride thus free from chlorine to vaporize nitrosyl chloride, passing vapors of nitrosyl chloride thus obtained upwardly in said column in contact with the descending flow of liquid mixture, passing the chlorine gas vaporized from the liquid mixture upwardly through said column in contact with a descending stream of liquid chlorine to free the chlorine gas of vapors of nitrosyl chloride, cooling the thus treated chlorine gas to liquefy it at least in part, passing thus liquefied chlorine as a liquid chlorine reflux in contact with the gases and vapors ascending through said rectifying column, continuously withdrawing another portion of said last mentioned chlorine gas as substantially pure chlorine product without refluxing it in said column, the ratio by weight of liquid chlorine refluxed to said chlorine withdrawn as product corresponding to $$0.35\left(0.6+\frac{NOCl}{Cl_2}\right)(0.75+\sqrt{p}) \text{ to }$$
$$1\left(0.6+\frac{NOCl}{Cl_2}\right)(0.75+\sqrt{p})$$

where $$\frac{NOCl}{Cl_2}$$

is the mol ratio of nitrosyl chloride and chlorine in said liquid mixture introduced into the rectifying column and $p$ is the pressure (in atmospheres) in said column, and continuously withdrawing nitrosyl chloride from the bottom of said column.

2. The process for the separation of a mixture of liquid nitrosyl chloride and chlorine which comprises continuously introducing said liquid mixture into a mid-portion of a rectifying column, passing the liquid mixture downwardly in the column in contact with vapors of nitrosyl chloride to vaporize the chlorine and substantially to free the mixture of chlorine leaving relatively pure nitrosyl chloride, continuously boiling the liquid nitrosyl chloride thus freed from chlorine to vaporize nitrosyl chloride, passing vapors of nitrosyl chloride thus obtained upwardly in said column in contact with the descending flow of liquid mixture, passing the chlorine gas vaporized from the liquid mixture upwardly through said column in contact with a descending stream of liquid chlorine to free the chlorine gas of vapors of nitrosyl chloride, cooling the thus treated chlorine gas to liquefy it at least in part passing thus liquefied chlorine as a liquid chlorine reflux in contact with the gases and vapors ascending through said rectifying column, continuously withdrawing another portion of said last mentioned chlorine gas as substantially pure chlorine product without refluxing it in said column, the ratio by weight of liquid chlorine refluxed to said chlorine withdrawn as product corresponding to $$0.35\left(0.6+\frac{NOCl}{Cl_2}\right)(0.75+\sqrt{p}) \text{ to }$$
$$1\left(0.6+\frac{NOCl}{Cl_2}\right)(0.75+\sqrt{p})$$

where $$\frac{NOCl}{Cl_2}$$

is the mol ratio of nitrosyl chloride and chlorine in said liquid mixture introduced into the rectifying column and $p$ is the pressure in atmospheres in said column, continuously withdrawing nitrosyl chloride from the bottom of said column, and maintaining the gases and vapors in said rectifying column under a pressure of about 4 to about 20 atmospheres.

3. The process for the separation of a mixture of liquid nitrosyl chloride and chlorine which comprises continuously introducing said liquid mixture into a mid-portion of a rectifying column, passing the liquid mixture downwardly in the column in contact with vapors of nitrosyl chloride to vaporize the chlorine and substantially to free the mixture of chlorine leaving relatively pure nitrosyl chloride, continuously boiling the liquid nitrosyl chloride thus freed from chlorine to vaporize nitrosyl chloride, passing vapors of nitrosyl chloride thus obtained upwardly in said column in contact with the descending flow of liquid mixture, passing the chlorine gas vaporized from the liquid mixture upwardly through said column in contact with a descending stream of liquid chlorine to free the chlorine gas of vapors of nitrosyl chloride, cooling the thus treated chlorine gas to liquefy it at least in part, passing thus liquefied chlorine as a liquid chlorine reflux in contact with the gases and vapors ascending through said rectifying column, continuously withdrawing another portion of said last mentioned chlorine gas as substantially pure chlorine product without reflux it in said column, the ratio by weight of liquid chlorine refluxed to said chlorine withdrawn as product corresponding to about 2 to about 3 parts of refluxed chlorine to one part of chlorine withdrawn as product, maintaining the gases and vapors in said rectifying column under a pressure of about 4 atmospheres, and continuously withdrawing nitrosyl chloride from the bottom of said column.

4. The process for the separation of a mixture of nitrosyl chloride and chlorine which comprises continuously introducing said mixture into a mid-portion of a rectifying column in which the mixture is directly contacted with a reflux of liquid chlorine flowing downwardly in the column and vapors of nitrosyl chloride passing upwardly in the column, passing the liquid flowing downwardly in the column in contact with the upwardly flowing vapors of nitrosyl chloride to vaporize the chlorine and substantially to free the liquid of chlorine leaving relatively pure nitrosyl chloride, continuously boiling the liquid nitrosyl chloride thus free from chlorine to form said vapors of nitrosyl chloride which pass upwardly in said column in contact with the descending flow of liquid, passing the chlorine gas in the column upwardly through said column in contact with the descending stream of said reflux of liquid chlorine to free the chlorine gas of vapors of nitrosyl chloride, cooling the thus treated chlorine gas to liquefy it as least in part and form the reflux of liquid chlorine which is passed downwardly in the column, continuously withdrawing another portion of said last mentioned chlorine gas as substantially pure chlorine product without refluxing it in said column, the ratio by weight of liquid chlorine refluxed to said chlorine withdrawn as product corresponding to $$0.35\left(0.6+\frac{NOCl}{Cl_2}\right)(0.75+\sqrt{p}) \text{ to}$$
$$1\left(0.6+\frac{NOCl}{Cl_2}\right)(0.75+\sqrt{p})$$

where $$\frac{NOCl}{Cl_2}$$

is the mol ratio of nitrosyl chloride and chlorine in said first mentioned mixture when it is introduced into the rectifying column as a mixture of liquid nitrosyl chloride and chlorine and when said first mentioned mixture is introduced into the rectifying column as a mixture of gaseous nitrosyl chloride and chlorine, said $$\frac{NOCl}{Cl_2}$$

is the mol ratio of nitrosyl chloride and chlorine in the condensate which would initially form upon cooling said first mentioned mixture to a temperature at which the gas is partially liquefied, and $p$ is the pressure in atmospheres) in said column, and continuously withdrawing nitrosyl chloride from the bottom of said column.

HERMAN A. BEEKHUIS, Jr.